E. B. JACOBSON.
GENERATING SYSTEM AND GENERATOR THEREFOR.
APPLICATION FILED NOV. 9, 1914.
1,261,239.
Patented Apr. 2, 1918.
3 SHEETS—SHEET 1.
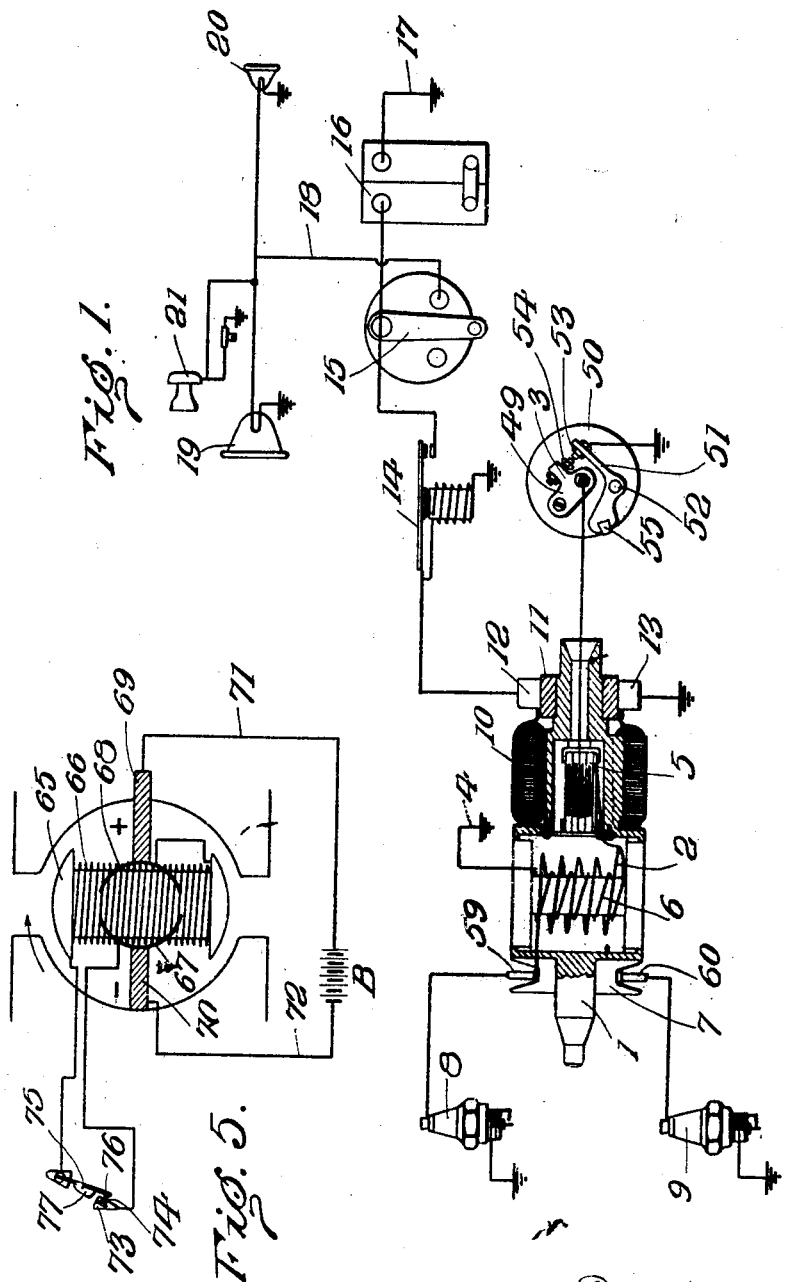

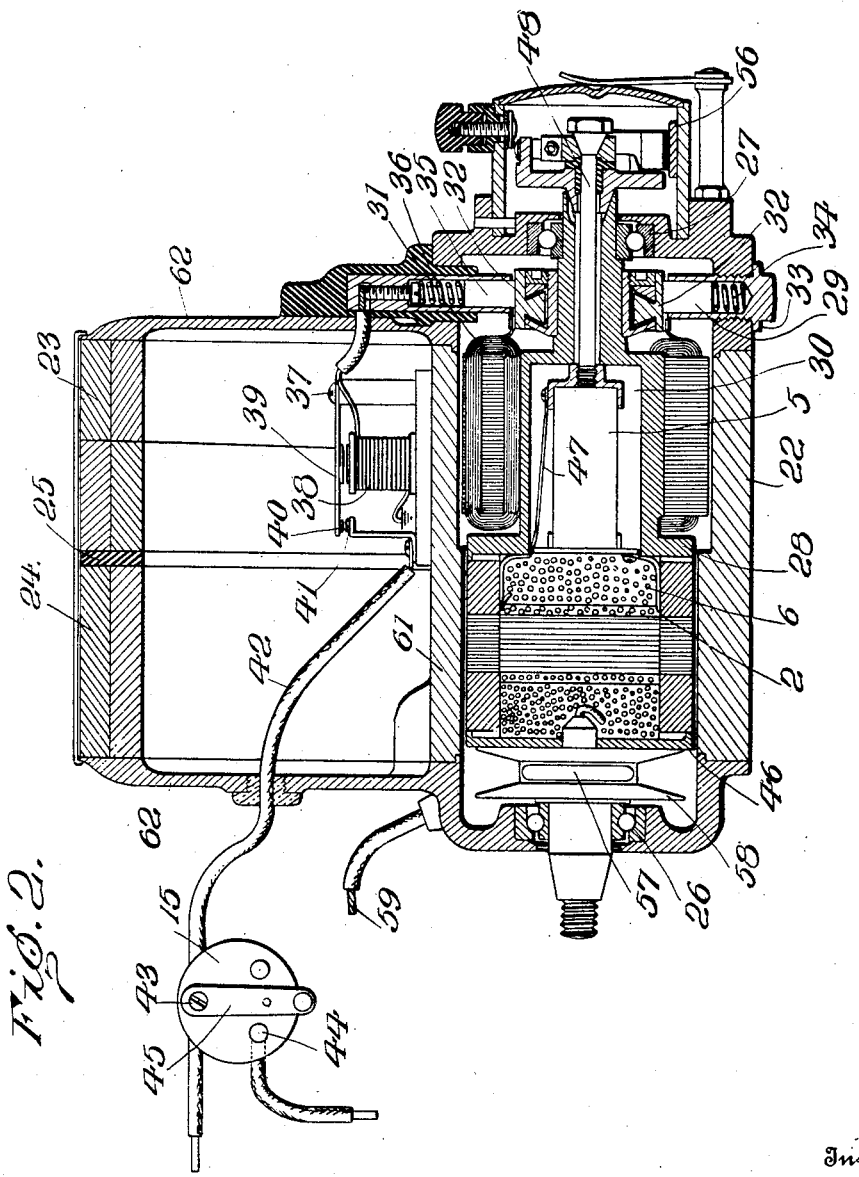

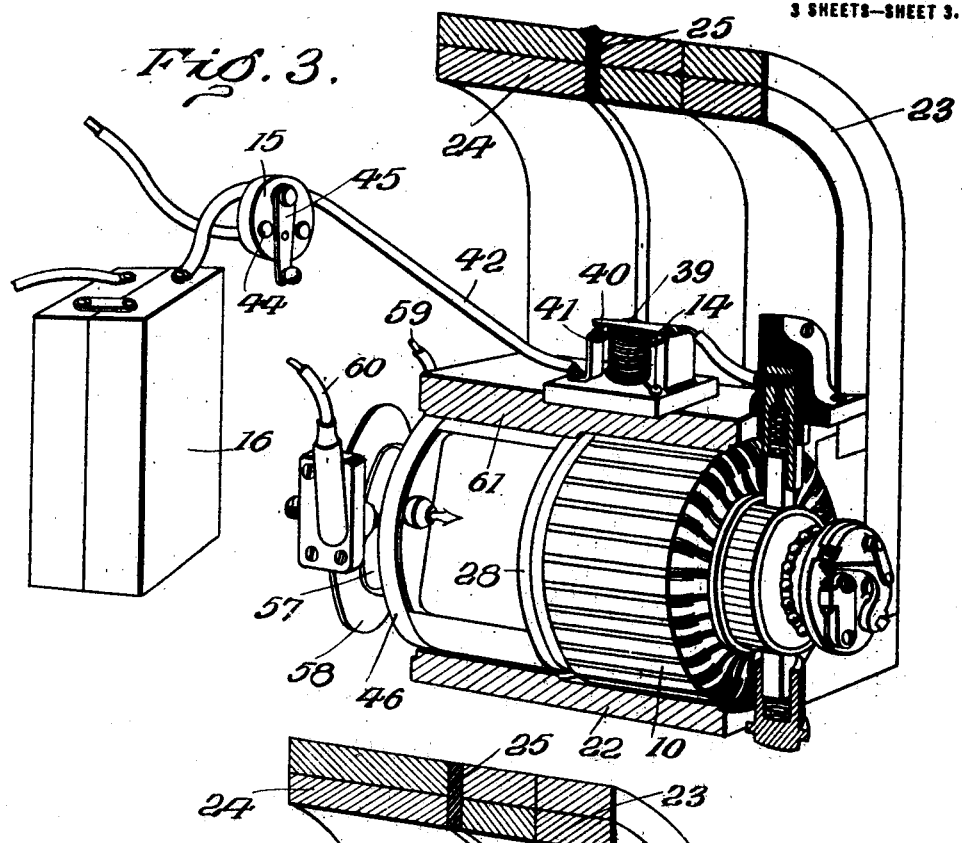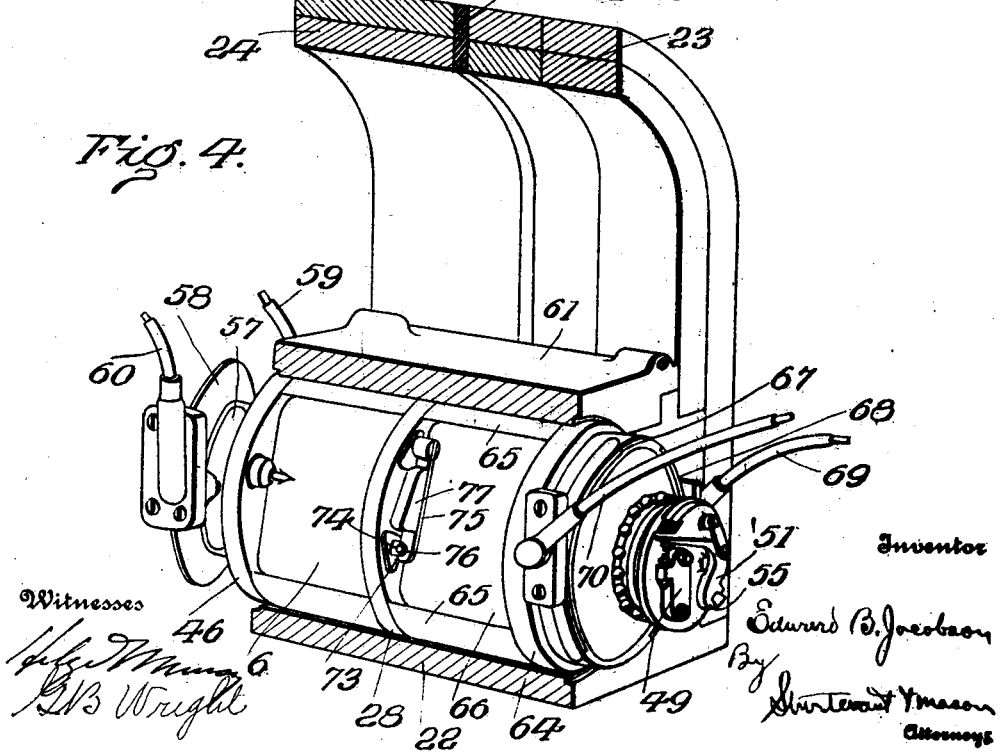

UNITED STATES PATENT OFFICE.

EDWARD B. JACOBSON, OF PITTSFIELD, MASSACHUSETTS, ASSIGNOR TO HENDEE MANUFACTURING COMPANY, OF SPRINGFIELD, MASSACHUSETTS, A CORPORATION OF MASSACHUSETTS.

GENERATING SYSTEM AND GENERATOR THEREFOR.

1,261,239.     Specification of Letters Patent.     Patented Apr. 2, 1918.

Application filed November 9, 1914. Serial No. 871,123.

*To all whom it may concern:*

Be it known that I, EDWARD B. JACOBSON, a citizen of the United States, residing at Pittsfield, in the county of Berkshire, State of Massachusetts, have invented certain new and useful Improvements in Generating Systems and Generators Therefor, of which the following is a description, reference being had to the accompanying drawing and to the figures of reference marked thereon.

The invention relates to new and useful improvements in generating systems and generators therefor, and more particularly to a generating system which may be used for furnishing ignition and charging a battery to be used for lighting or operating the horn of a motor vehicle.

An object of the invention is to provide a generating system, wherein the generator is provided with a single armature having separate and independent coils disposed thereon side by side longitudinally of the armature; one of which provides a high tension source of current for ignition, while the other provides an intermittent direct current for charging the battery.

A further object of the invention is to provide a generator with a single armature having separate and independent coils disposed thereon side by side longitudinally of the armature and with permanent field magnets which are separated from each other and which coöperate respectively with said coils.

These and other objects will in part be obvious and will in part be hereinafter more fully disclosed.

In the drawings—

Figure 1 is a diagrammatic view, showing a generating system embodying one form of the invention;

Fig. 2 is a vertical sectional view through a generator which may be used in my improved generating system;

Fig. 3 is a sectional view in perspective, showing the generator and the connection to a battery;

Fig. 4 is a view similar to Fig. 3, with the battery connection omitted and showing a modified form of the invention; and Fig. 5 is a diagrammatic view showing the intermittent positive current generator and its connection to the battery.

The invention consists generally in providing a generator having a single armature, at one end of which is a primary coil and a secondary coil which coöperate in furnishing the current supplied for ignition. The primary circuit is normally open and is closed with proper timing in order that a current may be induced in the secondary at the desired time for ignition. The secondary is connected through a distributer with the engine if more than one cylinder is used. Also located on the armature and at the other end thereof, is a coil, or a plurality of coils, which are connected to a commutator and brushes coöperating with the commutator to supply the battery with an intermittent positive charging current. I prefer to use U-shaped magnets and that the fields for the different generator coils shall be separated from each other.

Referring more in detail to the drawings, I have shown in Fig. 1 a generating system, wherein the armature is indicated at 1. Mounted on the armature is a primary coil 2, which is connected at one end with a circuit breaker 3 and at the other end with the ground at 4. A condenser 5 is connected at one end to the primary coil and at the other end to the ground. Also mounted on the armature 1 is a secondary coil 6. One terminal of the secondary coil is grounded, while the other terminal connects with a distributer 7. The distributer 7 supplies the current to the spark plugs 8 and 9 alternately. Each spark plug is grounded, as in the usual manner. I have provided the armature 1, as shown in Fig 1, with a series of coils 10, each of which connects with a commutator bar 11. Coöperating with the commutator bars is the positive brush 12 and the negative brush 13 which leads to ground. The positive brush 12 is connected through a cut-out 14 and a switch 15 to a battery 16. The other terminal of the battery is grounded as at 17. The switch 15 controls a circuit 18 leading to a head-light 19 and a tail light 20, and also to an electric horn 21.

The generating system will perhaps be better understood by a more detail description of the generator, as shown in Figs. 2 and 3. The generator includes a supporting base 22, on which is mounted two separate magnetic fields 23 and 24. These fields are separated by suitable installation at 25, Each magnetic field is in the form of a U-shaped magnet. The armature 1 rotates in a suitable ball bearing 26 at one end and a suitable ball bearing 27 at the other end. At the right-hand end, as shown in Fig. 2, said armature is in the form of a sleeve which is made integral with a disk plate 28 located substantially between the magnetic fields 23 and 24. The extreme outer end of the sleeve is reduced, as at 29, while the section between the reduced portion 29 and the disk plate 28 is formed with an enlarged chamber 30. Mounted on the sleeve are coils 31, each of which is connected to a commutator bar 32. The commutator bars 32 are of the usual construction and are secured to the reduced portion of the armature in any well known way.

The negative brush 33 is mounted in a suitable support which is grounded and is yieldingly pressed by a spring 34 against the commutator bars. The positive brush 35 is also mounted in a suitable brush holder and is yieldingly pressed against the commutator bars by a spring 36. The positive brush 35 is connected to the terminal 37 of the cut-out 14. This cut-out 14 consists of a coil 38, one end of which is connected with the terminal 37, while the other end is grounded, and an armature 39, which is controlled by the coil. Said armature carries a contact 40 which is adapted to engage a contact 41 when the armature is moved toward the coil and this establishes a circuit from the positive brush 35 through a line 42 to the switch 15. The switch 15 has a terminal 43, which connects with the circuit 42 and connects, also, with the positive pole of the battery 14. The switch 15 has another terminal 44, to which the line 18 is connected. A movable arm 45 serves as a means for connecting the line 18 with the battery and the generator.

At the other end of the armature from the commutator bars is a second disk plate 46. Between the disk plate 28 and the disk plate 46 is a T-shaped cross-armature, on which are wound the primary coil 2 and the secondary coil 6. Located in the chamber 30 is the condenser 5 and the primary coil 2 is connected with one terminal of this condenser, as has been pointed out above. Said primary, indicated at 47 in Fig. 2, also connects through the rod 48 with the circuit breaker 3. Said circuit breaker includes a plate 49, which is fixed to a disk 50 and a movable arm 51, which is pivoted at 52 to said disk. Said movable arm carries a contact 53 which is adapted to engage a contact 54 on the plate 49 when the outer end 55 of the arm 51 moves outwardly. This end 55 may be weighted so that the centrifugal force will tend to keep the contacts together. Suitable cam plates fixed to the casing of the generator engage at intervals the arm 51 and separate the contacts. One of these plates is indicated at 56 in Fig. 2 of the drawings. This circuit breaker is shown diagrammatically in the drawings as it forms no part of the present invention except as it coöperates in a general way to direct the circuit of the primary at the proper interval.

The present invention is particularly adapted for furnishing the ignition for a motorcycle, wherein the engine cylinders are set at an angle to each other. The cam plates 56, which operate the circuit breaker are disposed at proper angles to each other to provide a breaking of the circuit at proper intervals to supply current for such an engine.

The secondary coil 6 is connected to a distributer 57, which is mounted between disks 58 of insulating material and the brushes 59 and 60 make contact with this distributer plate and said brushes are connected respectively with the spark plugs 8 and 9. It will be understood that the base 22 and the cross plate 61 and also the end plates 62 and 63 are made of suitable non-magnetic material. The controller for the charging current is located on the cross-plate 61 and near the upper portion of the U-shaped field pieces. It will also be noted that the condenser is located wholly within that portion of the armature supporting the coils for the direct current generator. This makes a very compact arrangement of the parts of the generator, all of the parts being housed within the generator casing.

In Fig. 4 of the drawings, I have shown a modified form of the invention, wherein a single coil is substituted for the series of coils shown in Fig. 3. The construction and operation of this generator will perhaps be more apparent from Fig. 5 of the drawings.

Located between the central disk plate 28 and a second disk plate 64 is a cross armature 65. Wound on this cross armature is a single coil 66. One terminal of the coil is connected to a commutator plate 67, while the other terminal is connected with a commutator plate 68. These commutator plates are of considerable length extending through an arc of 90 to 150 degrees. Coöperating with the commutator plates is a positive brush 69 and a negative brush 70. These brushes are connected to the lines 71 and 72 with the terminal of the battery B. The coil 66 is broken and connected to a circuit breaker including a fixed terminal 73, having a contact 74 and a movable arm 75, having a contact 76. The arm 75 is flexible and is provided with a weight 77. The arm is normally held with the contact separated. This circuit breaker is mounted on the central disk 28 and as the armature rotates the centrifugal force operating through the weight 77 will close the contacts when said armature is speeded up sufficiently to produce a charging current for the battery.

From Fig. 5 of the drawings, it will be apparent that when the armature 65 is breaking away from the pole pieces, at which time the maximum change in the flow of magnetic flux occurs, the commutator 68 is in contact with the positive brush 69 and there will be a current impulse of a positive character sent through the battery. When the armature is turned through an arc of 180 degrees and is again breaking away from the pole pieces the flow of flux through the coil is in a reverse direction, but now the commutator bar 67 is in contact with the positive brush 69 and there will result a second intermittent positive impulse through the battery B. In other words, by the use of a single coil, I am able to secure an intermittent positive charging current with considerable intervals between the charging impulses. This provides a charging current for the battery, which will not overheat the battery or cause injury thereto even though the same operates continuously to charge the battery when said battery has reached approximately a full charge. With the intervals between the charging impulse the battery recovers and cools and thus injurious results are avoided. Furthermore, the intervals are sufficient to prevent the delivering of current when the voltage is below that of the battery.

The other end of the armature, as shown in Fig. 4, is provided with the primary and secondary windings precisely as above described, and a further description thereof is not thought necessary.

From the above description, it will be apparent that I have provided a generating system, wherein a high tension source of current may be provided for ignition and an intermittent positive current provided for charging the battery, which in turn may be used for lighting or operating the horn of a motor vehicle. The parts of the generator are very compact and thus the system is particularly adapted for operation upon a motor cycle.

It is obvious that minor changes in the detail of construction and the arrangement of parts may be made without departing from the spirit of the invention, as set forth in the appended claims.

Having thus described my invention, what I claim as new and desire to secure by Letters Patent, is:

1. A generating system comprising a generator, including a single armature having a primary coil thereon, a secondary coil on said armature coöperating with said primary coil, said secondary coil being connected to suitable ignition devices, a circuit breaker for said primary coil, a third coil located on said armature at one side of said first named coils, and means whereby an intermittent direct current may be derived therefrom for charging a battery or the like.

2. A generator including in combination an armature, bearings at each end of said armature, a primary coil mounted on said armature, a secondary coil coöperating with said primary coil on said armature, a distributer through which said secondary coil is connected with the ignition devices of a gas engine, the circuit breaker for said primary coil, and a third coil mounted on said armature at one side of said secondary and primary coils, and devices coöperating with said third coil for providing an intermittent direct current.

3. A generator including in combination an armature having a bearing at each end thereof, a disk located centrally of said armature and extending transversely thereof, a second disk at one end of said armature, a cross-armature between said disks and connected thereto, a primary and secondary coil on said cross armature, devices coöperating with said coils for furnishing a high tension ignition current; a third coil mounted on said armature between said central disk and the other end of said armature, and devices coöperating with said third coil for furnishing an intermittent direct current.

4. A generator including in combination an armature having a bearing at each end, a permanent magnetic field for said armature, a disk located centrally of said armature and extending transversely thereof, a second disk at one end of said armature, a cross armature connecting said disk, a primary and a secondary coil mounted on said cross-armature, said armature at the opposite side of said central disk having a chamber formed therein, a condenser located in said chamber and having one terminal connected to the primary, a circuit breaker located at the end of the armature and connected with said primary, a distributer located at the other end of the armature and connected to said secondary.

5. A generator including in combination an armature having a bearing at each end, permanent magnetic fields for said armature, said armature having a central disk, a second disk at one end of the armature, a cross armature connected to said disk, a primary and a secondary coil on said cross armature, said armature at the opposite side of said central disk having a chamber formed therein, a condenser located in said chamber and connected to said primary coil, a circuit breaker on one end of said armature and connected to said primary coil, a distributer at the other end of said armature, a third coil located on said armature between said disk and the circuit breaker, a commutator with which said last named coil is connected, and brushes coöperating with said commutator.

6. A generator including in combination an armature having a bearing at each end, permanent magnets for said armature, a disk located centrally of said armature, a second disk at one end of said armature, a cross armature connected to said disk, a primary and a secondary coil mounted on said cross armature, said armature at the other side of said disk having a chamber formed therein, a condenser located in said chamber, said condenser being connected to said primary coil, a circuit breaker at one end of said armature and connected to said primary coil, a distributer at the other end of the armature and connected to said secondary coil, a series of coils mounted on the armature adjacent said central disk, commutator bars mounted on said armature and connected with said coils, and brushes coöperating with said commutator bars.

7. A generator including in combination an armature having a bearing at each end, permanent magnets for said armature, a disk located centrally of said armature, a second disk at one end of said armature, a cross armature connected to said disk, a primary and a secondary coil mounted on said cross armature, said armature at the other side of said disk having a chamber formed therein, a condenser located in said chamber, said condenser being connected to said primary coil, a circuit breaker at one end of said armature and connected to said primary coil, a distributer at the other end of the armature and connected to said secondary coil, a series of coils mounted on the armature adjacent said central disk, commutator bars mounted on said armature and connected with said coils, brushes coöperating with said commutator bars, and a current control cut-out located in the space between the magnets for the current delivered by said brushes.

In testimony whereof, I affix my signature, in the presence of two witnesses.

EDWARD B. JACOBSON.

Witnesses:
   JOHN D. STEPHENS,
   CLARENCE A. EARL.